UNITED STATES PATENT OFFICE 2,335,537

AZO PIGMENTS AND METHOD OF PRODUCING

William B. Reynolds, Elmhurst, Long Island, N. Y., assignor to Interchemical Corporation, New York, N. Y., a corporation of Ohio No Drawing. Application June 12, 1940, Serial No. 340,096

6 Claims. (Cl. 260—151)

This invention relates to azo pigments and has particular reference to new pigments, characterized by brilliance of tone combined with fastness to light and resistance to bleeding in organic solvents. Specifically, this invention relates to the copper complexes obtainable from the couplings of beta-oxy naphthoic acid with diazotized primary aromatic mono-amines.

There has been considerable demand, particularly in the field of pigment printing on textiles, for pigments which would combine the features of brilliance of tone, fastness to light, and resistance to solvents such as acetone, while showing extremely good resistance to water and dilute soap solutions. In particular, acceptable browns and violets have been difficult to obtain unless insoluble vat dyestuffs are used.

I have discovered certain azo pigments which combine brilliance of tone, exceptionally good light fastness, and resistance to solvents with wash fastness. These pigments comprise the coppered complexes of the couplings of beta-oxy naphthoic acid with diazotized primary aromatic amines of the general formula $$X_nR \cdot NH_2$$

where R is a benzene or naphthalene nucleus, X is any substitutent of the group consisting of alkyl, aryl, aralkyl, alkoxy, halogen and nitro, and $n$ is a number from 4 to 3.

These pigments range in color from deep violet to brown, and are particularly desirable as substitutes for the more expensive insoluble vat dyestuffs where pigment printing is being done. A particularly useful brilliant brown can be prepared by using paranitraniline as the amine; this color is unusually rich, is extremely fast to light, and is resistant to solvents and washing.

These new pigments can be represented by the general formula:

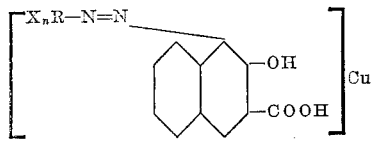

where R is a benzene or naphthalene nucleus, X is any substitutent of the group consisting of alkyl, aryl, aralkyl, alkoxy, halogen and nitro, and $n$ is a number from 0 to 3.

Typical amines which can be used include paranitraniline, para chloro ortho nitraniline, ortho anisidine, meta nitro para toluidine, and alpha naphthylamine.

Typical examples of my invention are the following:

Example 1

138 parts of paranitraniline are stirred with 3000 parts of water and 300 parts of 31% hydrochloric acid solution for 20 minutes. The slurry is iced to 0° C., and diazotized by the rapid addition of 69 parts of sodium nitrite dissolved in 200 parts of water. The diazo thus prepared is run into a cold coupling solution prepared by dissolving 185 parts of beta hydroxy napthoic acid in 4000 parts of water with 250 parts of soda ash. When the coupling is complete the charge is heated with steam to 90° C., and coppered by the gradual addition of 270 parts of blue vitriol dissolved in 800 parts of hot water. The charge is held at 90–100° C. for ½ hour, then filtered and washed salt free. Solids run 20 to 25%. This product is a clean yellow shade brown, and has excellent fastness properties.

Example 2

Example 1 may be repeated, using 152 parts of meta-nitro paratoluidine to replace the paranitraniline. A brown of slightly redder shade is obtained, with similar properties.

Example 3

197 parts of 4-amino-benzo-phenone, substituted for the paranitraniline in Example 1, gives a very reddish brown shade pigment, with similar properties.

The typical precautionary measures useful in diazotization reactions should be observed, these varying of course with the particular amine. In coupling, I prefer to operate with the beta oxy naphthoic acid partially out of solution, as I find that improved results are obtained in more concentrated coupling solutions.

The copper probably couples by forming a complex between the phenolic hydroxyl and the carboxyl group. I find that about 10 to 15% excess of copper is desirable over that necessary to produce the theoretical equi-molar complex with the beta-oxy naphthoic acid (i. e. one mol of copper per mol of dyestuff). The coppering can take place in neutral or alkaline solutions (pH 7.0 or higher), the copper may be present as a simple salt, or as a complex such as the copper ammonium complex. In general, rather elevated temperatures (60–100° C.) are necessary to insure complete coppering.

Obviously, many changes can be made in the specific examples, without departing from the scope of the invention, which is defined in the claims.

I claim:

1. As new pigment dyestuffs, the water-insoluble compounds of the general formula:

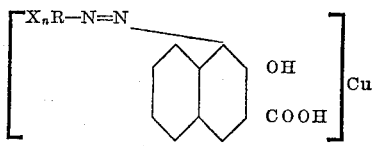

where R is a nucleus of the group consisting of benzene and naphthalene nuclei free of water-solubilizing substituents, X is a substituent of the group consisting of alkyl, alkoxy, halogen and nitro, and $n$ is a number from 0 to 3.

2. As new pigment dyestuffs, compounds of the following formula:

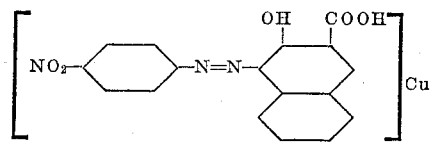

3. The method of making a pigment dyestuff, which comprises diazotizing an amine of the formula:

$$X_n\text{—}R\text{—}NH_2$$

where R is a nucleus of the group consisting of benzene and naphthalene nuclei free of water-solubilizing substituents, X is a substituent of the group consisting of alkyl, alkoxy, halogen and nitro, and $n$ is a number from 0 to 3, coupling the diazo compound with beta hydroxy naphthoic acid, and coppering in substance the azo compound so produced.

4. The method of making a pigment dyestuff, which comprises diazotizing an amine of the formula:

$$X_n\text{—}R\text{—}NH_2$$

where R is a nucleus of the group consisting of benzene and naphthalene nuclei free of water-solubilizing substituents, X is a substituent of the group consisting of alkyl, alkoxy, halogen and nitro, and $n$ is a number from 0 to 3, coupling the diazo compound with beta hydroxy naphthoic acid, and coppering in substance the azo compound so produced by treatment with a copper compound at a pH of at least 7.0.

5. The method of making a pigment dyestuff, which comprises diazotizing an amine of the $$X_n\text{—}R\text{—}NH_2$$

where R is a nucleus of the group consisting of benzene and naphthalene nuclei free of water-solubilizing substituents, X is a substituent of the group consisting of alkyl, alkoxy, halogen and nitro, and $n$ is a number from 0 to 3, coupling the diazo compound with beta hydroxy naphthoic acid, and coppering in substance the azo compound so produced by treatment with a copper compound at a pH of at least 7.0 at a temperature of at least 60° C.

6. The method of claim 3, in which the amine is paranitraniline.

WILLIAM B. REYNOLDS.